(12) United States Patent
Peterson et al.

(10) Patent No.: US 6,173,319 B1
(45) Date of Patent: Jan. 9, 2001

(54) USING A SYSTEMS NETWORK ARCHITECTURE LOGICAL UNIT ACTIVATION REQUEST UNIT AS A DYNAMIC CONFIGURATION DEFINITION IN A GATEWAY

(75) Inventors: Mitchell Owen Peterson, Seattle; Brian Dudley Silverman, Bellevue, both of WA (US)

(73) Assignee: Attachmate Corporation, Bellevue, WA (US)

(*) Notice: Under 35 U.S.C. 154(b), the term of this patent shall be extended for 0 days.

(21) Appl. No.: 09/075,458

(22) Filed: May 8, 1998

(51) Int. Cl.[7] .................................................. G60F 15/177
(52) U.S. Cl. .................... 709/220; 709/221; 709/222; 709/223; 707/201
(58) Field of Search ......................... 709/220, 224, 709/223, 202, 221, 222; 707/201, 203; 370/401

(56) References Cited

U.S. PATENT DOCUMENTS

| | | | | |
|---|---|---|---|---|
| 5,802,053 | * | 9/1999 | Bollella et al. ...................... | 370/401 |
| 5,822,305 | * | 10/1998 | Vaishnavi et al. ................... | 370/254 |
| 5,918,017 | * | 6/1999 | Attanasio et al. .................... | 709/224 |
| 5,935,215 | * | 8/1999 | Bell et al. ............................. | 709/239 |
| 5,964,837 | * | 10/1999 | Chao et al. .......................... | 709/224 |
| 5,999,974 | * | 12/1999 | Ratcliff et al. ....................... | 709/224 |
| 6,088,728 | * | 7/2000 | Bellemore et al. .................. | 709/227 |
| 6,088,738 | * | 7/2000 | Okada ................................... | 709/245 |
| 6,098,101 | * | 8/2000 | Sears ..................................... | 709/224 |

OTHER PUBLICATIONS

IBM Technical Disclosure Bulletin, "Supporting Advanced Peer–to–Peer Networking Session Services Extensions Protocols over non–Systems Network Architecture Transport Networks", vol. 39, No 11, pp. 153–160, Nov. 1996.*

Ogle et al., "Dynamically Selecting Protocols for Socket Applications", IEEE Network 0890–8044/92, pp. 48–57, May 1993.*

* cited by examiner

Primary Examiner—Dung C. Dinh
Assistant Examiner—Bradley Edelman
(74) Attorney, Agent, or Firm—Brian L. Johnson; George C. Rondeau, Jr.; Seed IP Law Group PLLC

(57) ABSTRACT

An improved method and system for initializing the logical units (LUs) in a Gateway between an SNA network having a mainframe host computer and another network. An activation procedure derives the Table of Boundary LUs on the mainframe host computer by noting the device logical unit numbers within the set of 'Activate Logical Unit' (ACTLU) SNA Request Units. If the mainframe host computer includes an LU in its Table of Boundary LUs, then the activation procedure creates a corresponding LU in the Gateway. The activation procedure also marks each of the created LUs in the Gateway as active. The newly created LUs are then added to the resource pool of LUs available to the network.

43 Claims, 12 Drawing Sheets

GATEWAY MATRIX

| PU 001 | LU 001 | ... | LU 011 | LU 012 | LU 013 | ... | LU 201 | ... | LU 255 |
| PU 002 | LU 001 | LU 002 | LU 003 | ... | LU 014 | ... | LU 253 | LU 254 | LU 255 |
| PU 003 | ... | LU 010 | ... | LU 081 | ... | LU 130 | LU 131 | ... | |
| PU 004 | LU 001 | LU 002 | ... | LU 080 | ... | LU 125 | ... | LU 255 | |
| PU 005 | LU 001 | LU 002 | LU 003 | ... | | LU 125 | LU 126 | ... | |
| PU 006 | ... | . | . | . | | . | . | LU 254 | ... |
| PU 007 | ... | LU 008 | LU 009 | LU 010 | ... | | | LU 255 | |
| PU 008 | LU 001 | ... | . | . | . | | | LU 255 | |
| PU 009 | ... | LU 020 | LU 021 | LU 022 | ... | LU 250 | ... | | |
| PU 010 | LU 001 | ... | | | | | | | |
| PU 011 | LU 001 | ... | LU 139 | LU 140 | LU 141 | ... | | | |
| PU 012 | ... | LU 010 | . | . | . | | LU 253 | LU 254 | LU 255 |

*Fig. 5 (Prior Art)*

USING A SYSTEMS NETWORK ARCHITECTURE LOGICAL UNIT ACTIVATION REQUEST UNIT AS A DYNAMIC CONFIGURATION DEFINITION IN A GATEWAY

TECHNICAL FIELD

The present invention relates to computer programming and, in particular, to a method and system for dynamically indicating the active logical units (LUs) of a Systems Network Architecture (SNA) communications network in a Gateway between the SNA network and another computing network.

BACKGROUND OF THE INVENTION

The Systems Network Architecture (SNA) is a widely used and highly successful communications framework developed by IBM that defines network functions and establishes standards for enabling computers to exchange and process data. SNA provides a coherent structure that enables users to establish and manage their networks and to change or expand them in response to new requirements and technologies. SNA includes products, combinations of hardware and programs designed in accordance with SNA specifications. In addition to a large number of computer terminals for both specific industries and general applications, IBM's SNA product line includes host processors, communication controllers, adapters, modems, and data encryption units. The SNA product line also includes a variety of programs and programming subsystems, such as telecommunications access methods, network management programs, distributed application programs and network control programs (NCPs).

SNA describes rules that enable users to transmit and receive information through their computer networks. As shown in FIG. 1, SNA utilizes a tree-structured architecture with a mainframe host computer 101 acting as the network control center. The network also includes terminals 102, front-end processors 103, workstations 104, and cluster controllers 105. The boundaries described by the mainframe host computer 101, front-end processors 103, cluster controllers 105, workstations 104 and terminals 102 are referred to as the network's domain 108. SNA network nodes include the various equipment attached to the network, such as the front-end processors 103 and the terminals 102. Unlike a switched telephone network that establishes physical paths between terminals for the duration of a session, SNA establishes a logical path between network nodes, such as the terminals 102, and routes each message with addressing information contained in the SNA protocol.

FIG. 2 displays the SNA communication protocol stack. SNA utilizes a communications stack for transferring data between computers, such as between the mainframe host computer 101 and the workstation 104 shown in FIG. 1. SNA utilizes five layers for communication within a domain: a function management layer 201, a data flow control layer 202, a transmission control layer 203, a path control layer 204, and a data-link control layer 205. The layers form a sequence from a lowest layer (the data-link control layer 205) to the highest layer (the function management layer 201). The layers divide the processing necessary for communicating between computers into discrete units. The data-link control layer 205 in the communications stack typically interacts with the physical medium used for transferring the data, such as coaxial cables. The function management layer 201, as the top layer of the communications stack, provides services to application programs, and the middle layers of the communications stack typically are responsible for routing and maintaining a connection.

A local computer transfers data to a remote computer when an application program first passes the data to the function management layer 201 of the communications stack of the local computer. The function management layer 201 then processes the data and sends the data to the next lowest layer in the communications stack, the data flow control layer 202. Thereafter, each layer in turn processes the data until the data reaches the bottom layer, the data-link control layer 205, where the data is sent to the remote computer over the transfer medium. The data-link control layer 205, as the bottom layer of the communications stack, may also receive data from the transfer medium and pass the data up the communications stack. Each layer performs its specific processing on the data until the data reaches the function management layer 201. The function management layer 201 processes the data and sends the data to an application program.

SNA utilizes various protocols including the Synchronous Data Link Control (SDLC), Data Link Control (DLC 802.2), and Data Link Control over Channel or Fiber Optics (DLC Channel/ESCON) protocols. SDLC is a bit-oriented synchronous communications protocol developed by IBM. SDLC provides high speed data transfer between SNA devices, such as the mainframe host computer 101 and the workstation 104 shown in FIG. 1. SDLC forms data into packets, known as frames, with as many as 128 frames transmitted sequentially in a given data transfer. As shown in FIG. 3, each frame 300 comprises a header 301, text 302, and a trailer 303. The header 301 consists of framing bits 301a indicating the beginning of the frame, address information 301b and various control data 301c. The text 302, or data payload, consists of as many as seven blocks of data, each having as many as 512 characters. A Request Unit (RU) is a basic unit of data in SNA. The trailer 303 comprises a frame check sequence (FCS) 303a for error detection and correction. A set of framing bits 303b mark the end of the frame 300. SDLC supports device communications generally conducted over high speed, dedicated private line, digital circuits. SDLC can operate in either point-to-point or multipoint network configurations. DLC over Local Area Network (LAN) specification 802.2 Ethernet or Token Ring, Bus and Tag Channel, and Enterprise System Connection (ESCON) may all be utilized as low-level protocols to accomplish SNA traffic exchange with a mainframe computer.

A logical unit (LU) is an SNA access port for network nodes such as the workstation 104 shown in FIG. 1. Each LU denotes the beginning or end of a communications system. In a bisynchronous network, an LU is a port through which a user accesses network services. An LU may support sessions with a system services control point (SSCP) on the mainframe host computer and with other LUs. LU 6.2, also known as advanced program-to-program communication (APPC), is a version of the LU that allows for peer-to-peer or program-to-program communications. The LU 6.2 protocol standard frees application programs from network-specific details. For example, on an IBM PC, an LU 6.2-equipped program accepts commands and passes them on to an SDLC card that communicates directly with the mainframe host computer or a token ring handler. LU 6.2 also creates a transparent environment for application-to-application communications, regardless of the types of systems used or their relative locations. For example, LU 6.2 enables users to develop application programs for peer-to-peer communications between PCs and IBM host computers. LU 6.2 also increases the processing power of the PC without the constraints of mainframe-based slave devices, such as the IBM 3274/3276 controllers.

A physical unit (PU) is the SNA component that manages and monitors the resources of a network node, such as the network node's attached links and adjacent link stations. SNA utilizes a classification system for PUs similar to a classification system used for network node types. PU 2.0 and 2.1 are protocols that allow applications written to APPC and interpreted by LU 6.2 that respectively access a mainframe host computer (PU 2.0) and a token ring local area network (LAN) (PU 2.1). PU type 2 refers to the management services in an SNA network node that always contains one PU representing the device and its resources to the network. PU type 2 is often referred to as a "cluster controller." PU type 4 is an IBM SNA front-end processor, such as the front-end processors 103 shown in FIG. 1. PU type 5 is an IBM SNA mainframe, such as System/370 or System/390. PU type 5 runs SNA's Virtual Telecommunications Access Method (VTAM) to handle data communications. VTAM will be discussed further below.

A systems services control point (SSCP) is an SNA term for software that manages the available connection services to be used by the network control program (NCP). There is only one SSCP in an SNA network domain, such as the domain 108 shown in FIG. 1, and the software normally resides in the mainframe host computer 101, such as a mainframe host computer of the IBM system/370 mainframe family. An LU may support sessions with the mainframe host computer based SSCP.

A Network Addressable Unit (NAU) in SNA may include both an LU, a PU, or an SSCP representing the origin or destination of information transmitted by the path control layer of an SNA network, such as the path control layer 204 of the SNA communications stack shown in FIG. 2. Each SNA network node has a unique address. The SNA Node Type (NT) provides the SNA classification of a network device based on the protocols it supports and the Network Addressable Units (NAUs) it contains. For example, Type 1 and Type 2 nodes are peripheral nodes, and Type 4 and 5 nodes are sub-area nodes.

The Virtual Telecommunications Access Method (VTAM) is a program component in an IBM computer that processes many of the SNA communications tasks for an application program. VTAM performs addressing and control path functions in an SNA network, allowing a terminal or an application to communicate with and transfer data to another application along a transmission medium. For example, in an IBM 370 or compatible computer, VTAM provides users at remote terminals with access to applications in the mainframe host computer. VTAM typically resides in the mainframe host computer. VTAM also provides resource sharing, a technique for efficiently using a network to reduce transmission costs.

A Gateway provides an entrance into and exit from a communications network such as an SNA network. A network systems engineer typically places a Gateway between two networks, such as an SNA network and a network utilizing another protocol. The Gateway functions as an electronic repeater device that intercepts and steers electronic signals from one network to another, such as from an SNA network to another type of network. Devices using asynchronous or binary synchronous communications may access SNA only through protocol converters such as a Gateway. Generally, a Gateway includes a signal conditioner that filters out unwanted noise and control characters. In data networks, Gateways are typically a node on both of two networks that connects two otherwise incompatible networks. For example, personal computer (PC) users on a local area network (LAN) may require a Gateway in order to access to a mainframe computer that does not utilize the same communication protocols as the PC. Thus, Gateways on data networks typically perform code and protocol conversion processes. FIG. 4 illustrates a Gateway 401 connecting the SNA network shown in FIG. 1 to another network 402.

In any computing system, faster and more efficient operations are always desirable. The complexity and sophistication of modern computing system designs, such as that provided by SNA, often render observation and diagnosis of latent inefficiencies extremely difficult. In addition, computer programmers typically follow the if-it-ain't-broke-don't-fix-it paradigm for improving computing systems and its corollary squeaky-wheel-gets-the-grease methodology. Unfortunately, the goal of achieving the highest possible levels of computing system efficiency may be thwarted by these approaches when a computing system or computing network functions adequately but at an efficiency level below its maximum potential due to an inherent inefficiency that passes undetected because the inefficiency is not so severe as to render the system inoperable.

SUMMARY OF THE INVENTION

Embodiments of the invention provide an improved method and system for initializing the active logical units (LUs) in a Gateway between an SNA network having a mainframe host computer and another network. An activation procedure examines a list of active LUs on the mainframe host computer. If the mainframe host computer lists the LU as active, then the activation procedure marks the LU as active in the Gateway. The activation procedure also creates an LU in the Gateway for each of the active LUs on the mainframe host computer. The activation procedure marks each of the created LU as active in the Gateway.

Embodiments of the invention are also applicable to a method and system in which a dependent LU in the Gateway is created to match a dependent LU in the mainframe host computer of the SNA network. A pipe, or another form of communication link, is then established between the two matched LUs.

Embodiments of the invention are also applicable to any system in which a human configures a list of active elements in a Gateway switch between two systems when the correct list of active elements is stored in one of the two connected systems.

BRIEF DESCRIPTION OF THE DRAWINGS

A preferred embodiment of the present invention will be described below relative to the following Figures. Note that similar elements and steps in the Figures have the same reference number.

FIG. 5 illustrates an exemplary prior art Gateway Matrix having LUs and PUs.

DETAILED DESCRIPTION OF THE INVENTION

The present invention arises from the inventors' discovery of a gross inefficiency in the Systems Network Architecture (SNA) architecture. The SNA architecture has been utilized for nearly 30 years apparently without a skilled SNA artisan recognizing the desirability of changing how logical units (LUs) are activated in Gateways.

The inventors first identified the following anomalies in the standard SNA architecture while running a "sniffer trace" in the process of debugging a computer program being processed on an SNA network. A "sniffer trace" provides a means for monitoring the operations of a network. During this "sniffer trace," the inventors observed that the Gateway matched its list of active LUs against the actual list of active LUs in the mainframe host computer supporting the SNA network and only established communications links between LUs in the mainframe host computer and LUs in the Gateway where a match could be found.

The accepted practice for initializing Gateways during the past 30 years has been performed as follows. First, a human systems manager configures a Gateway Matrix indicating the LUs connected to the Gateway. FIG. 5 illustrates a typical Gateway Matrix 501, having up to 255 possible LUs 502 for each PU 503 in the matrix. As shown in FIG. 5, the systems manager has not created all of the possible LUs 502 in the Gateway Matrix 501. The set of active LUs 502 in the Gateway Matrix 501 should be matched with a Boundary LU Table in the mainframe host computer representing the LUs at the Gateway edge of the SNA network. The Boundary LU Table in the mainframe host computer is defined in VTAM's configuration files.

Figure 1:
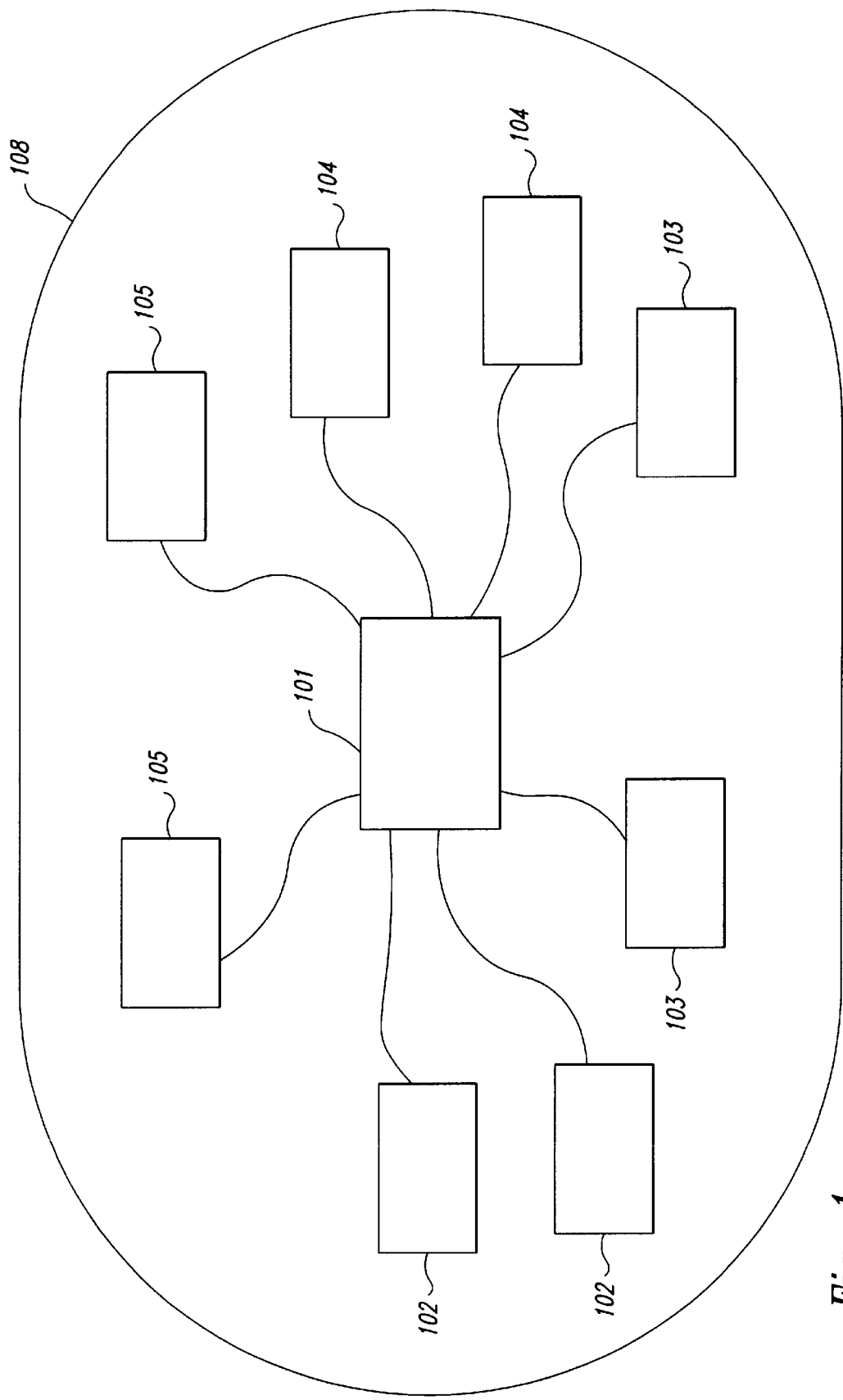
FIG. 1 illustrates a prior art tree-structured architecture utilized by SNA network having a mainframe host computer acting as the network control center.
Figure 2:
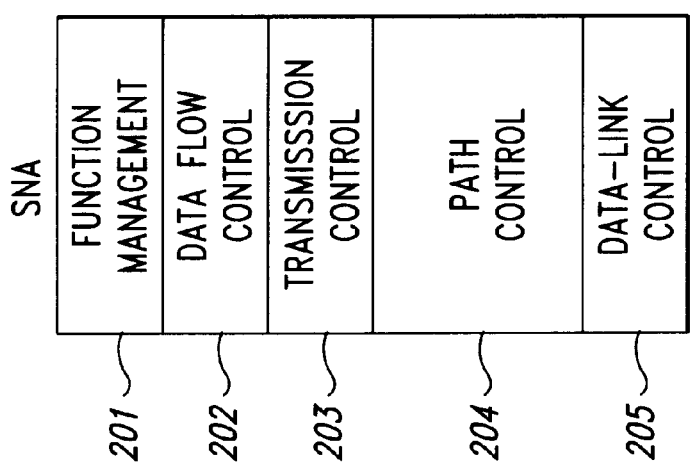
FIG. 2 displays a prior art SNA communication protocol stack used by the SNA network of FIG. 1.
Figure 3:
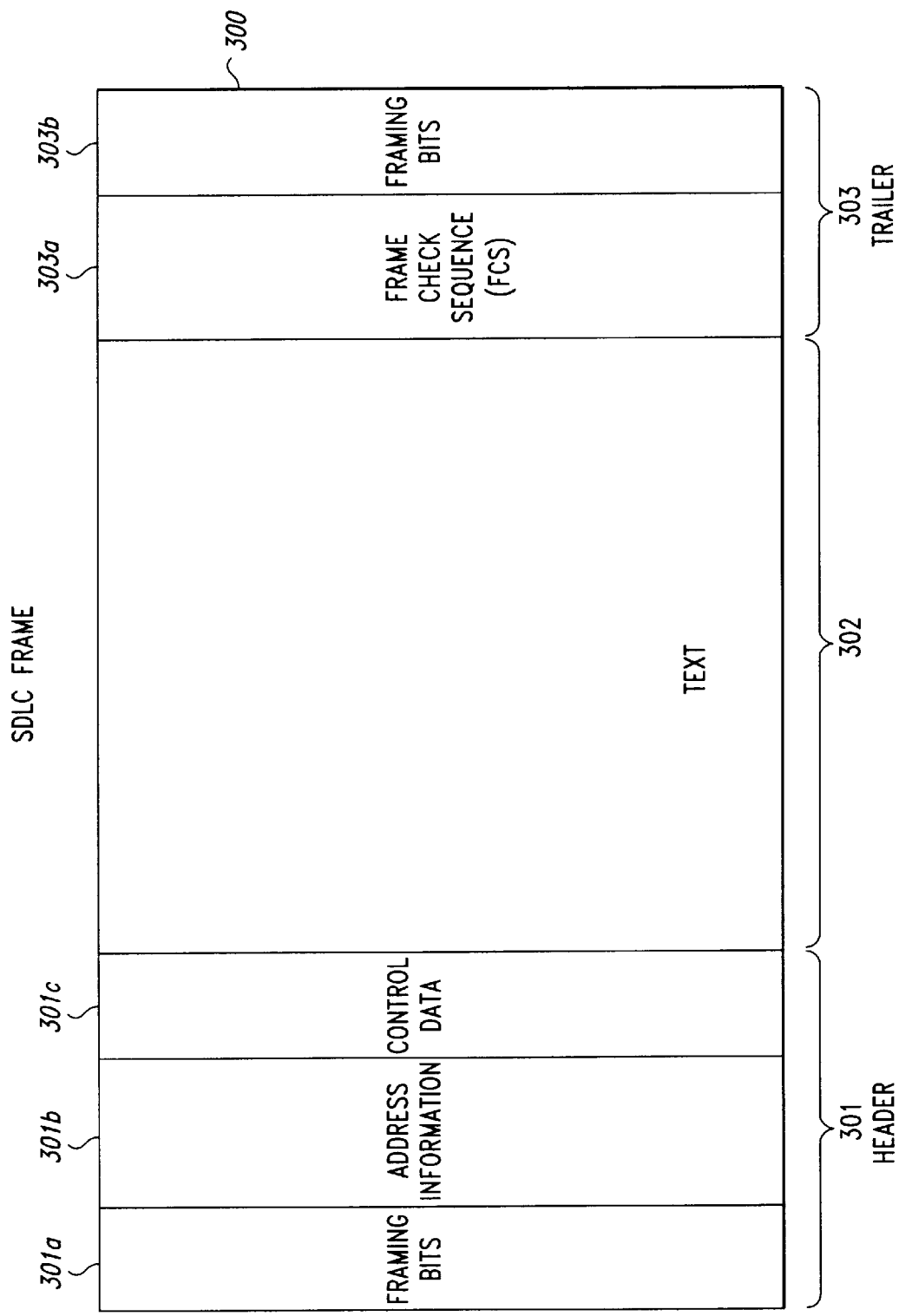
FIG. 3 illustrates prior art the frame structure of the Synchronous Data Link Control (SDLC) protocol utilized by SNA.
Figure 4:
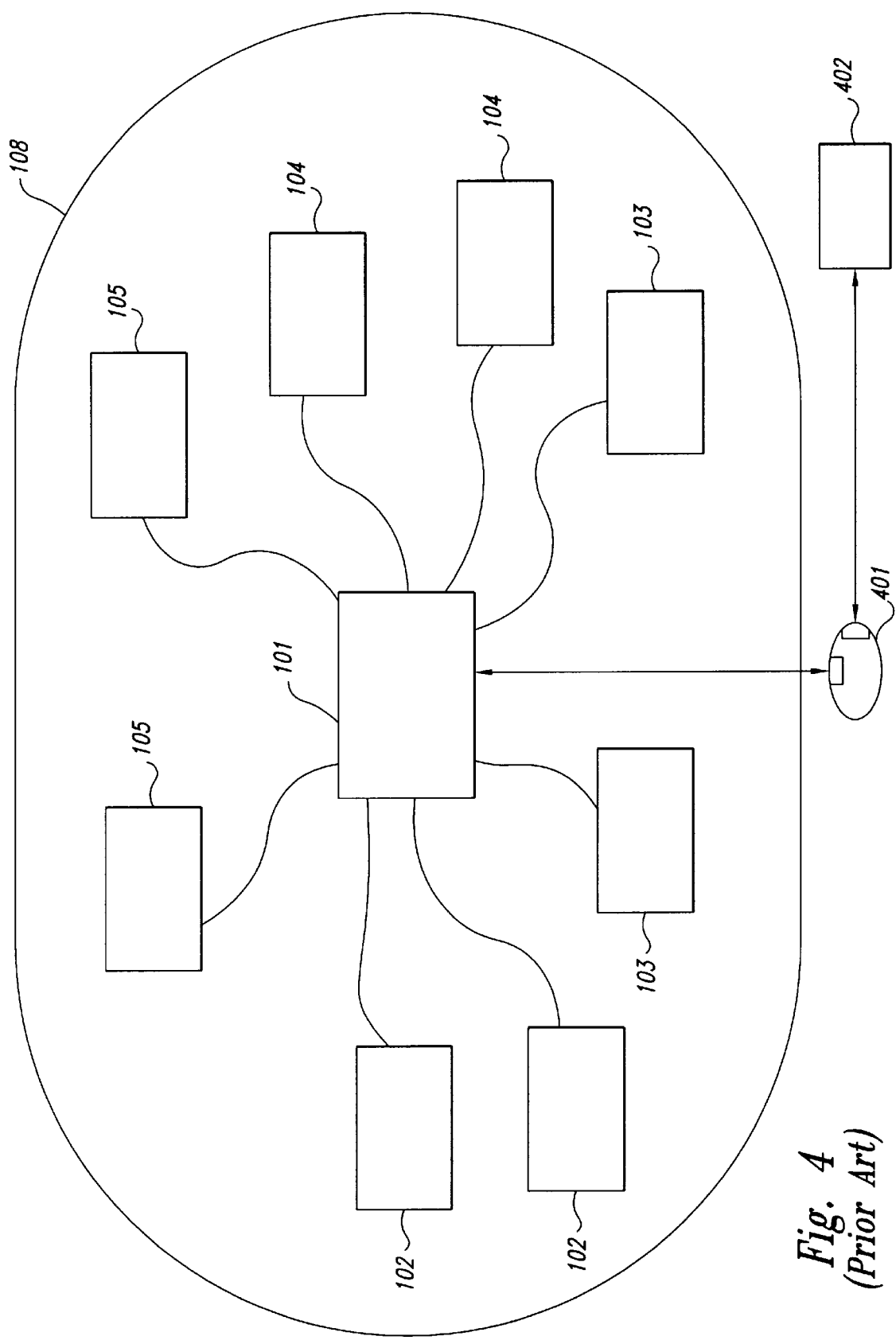
FIG. 4 illustrates prior art a Gateway connecting the SNA network shown in FIG. 1 to another network.
Figure 6:
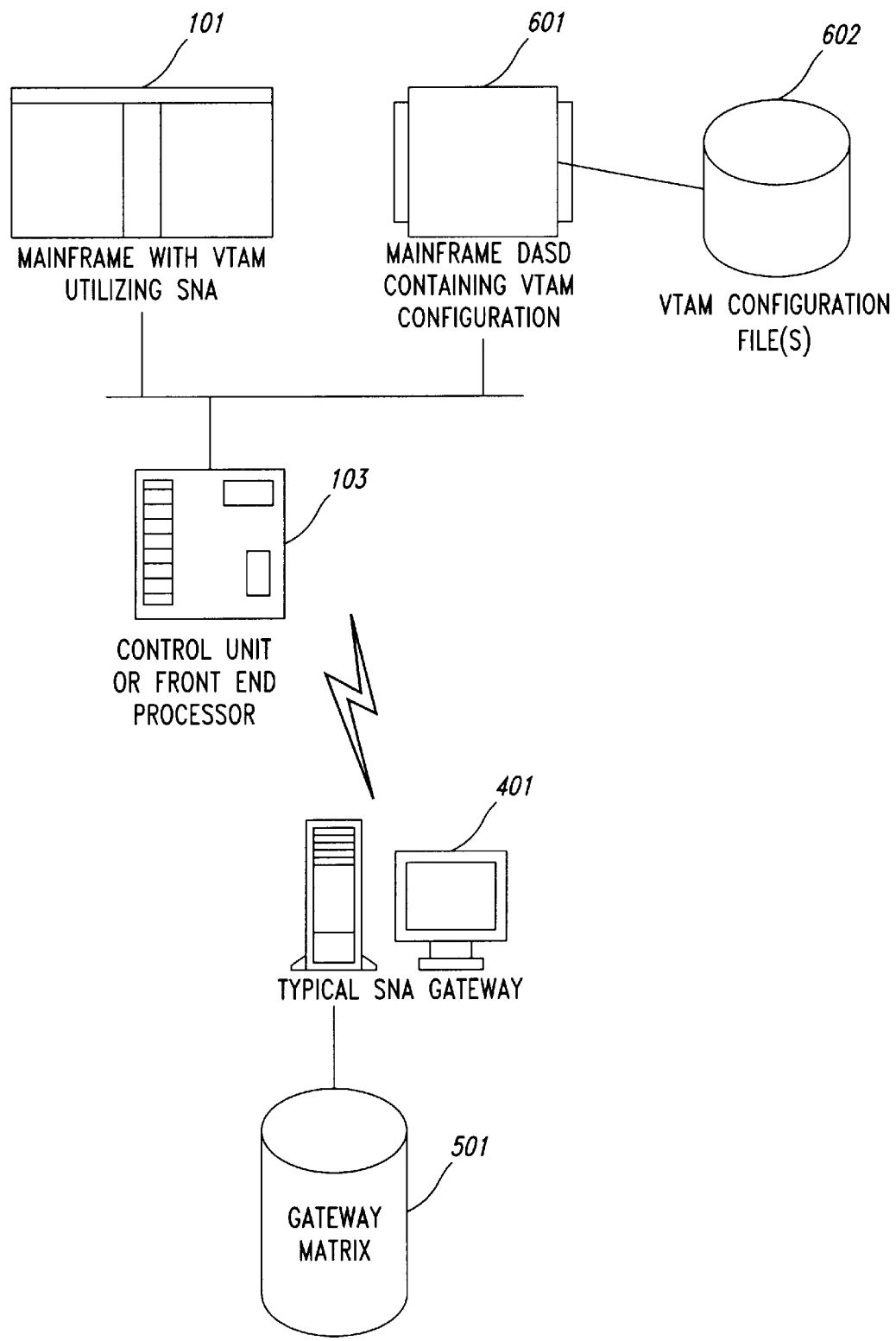
FIG. 6 provides an exemplary prior art SNA network configuration, illustrating the network system components that operate during activation of the Gateway.

FIG. 6 provides an exemplary prior art SNA network configuration, including the SNA Gateway 401 (see FIG. 4), that illustrates the network system components that operate during activation of the Gateway 401. When VTAM determines that a node in the network, such as the Gateway 401, needs to be initialized, VTAM reads the VTAM configuration file for that node, such as the Table of Boundary LUs. The VTAM configuration file contains the PU and LU definitions describing the node and is typically contained in a flat file, a file consisting of records of a single type having no embedded structural information that governs relationships between the records. A mainframe direct access storage drive (DASD) computer 601 accesses the VTAM configuration files 602 and passes the VTAM data to the mainframe host computer 101. A front-end processor 103 may intercede between the mainframe host computer 101 and the SNA Gateway 401.

The communications systems of the SNA network are initialized according to the standard SNA procedures. The network hardware adapter and PUs are loaded into the host mainframe computer 101 as usual. In addition, the LU definitions available to the host mainframe computer are also defined in Resource Pools. The Resource Pool manages and makes available LUs for the use of clients to the mainframe host computer. If an LU is not defined in a Resource Pool, then the network clients may not access it.

VTAM sends a specific Request Unit (RU) known as an "Activate PU" (ACTPU) to the Gateway 401 that informs the Gateway 401 that VTAM now recognizes the Gateway 401 as available for network activity. In response, the Gateway 401 retrieves the PUs in its static configuration such as may be found in the Gateway Matrix 501. If these PUs are found, the Gateway 401 sends a positive sense code to the RU, indicating that the Gateway 401 is available.

VTAM then sends RU known as "Activate Logical Unit" (ACTLU) to signal the Gateway 401 that its LUs are now viewed by the network as online and active. ACTLU includes a list of LUs that the mainframe host computer 101 believes to be active in the Gateway 401. The list of LUs that the mainframe host computer 101 believes to be active are contained in the VTAM configuration files 602 such as the Table of Boundary LUs.

The Gateway 401 again checks its user-defined configuration file, the Gateway Matrix 501, to determine the validity of each LU in the list provided by ACTLU. If the LU is in the Gateway Matrix 501, then the Gateway 401 marks the LU as "Active" and sends ACTLU a positive response code for that LU. If the Gateway 401 does not find a matching LU, then the Gateway 401 responds with either a negative sense code (LU not available) or sends a positive sense code along with an "SLU disabled" control vector that signifies a powered off device.

Figure 7:
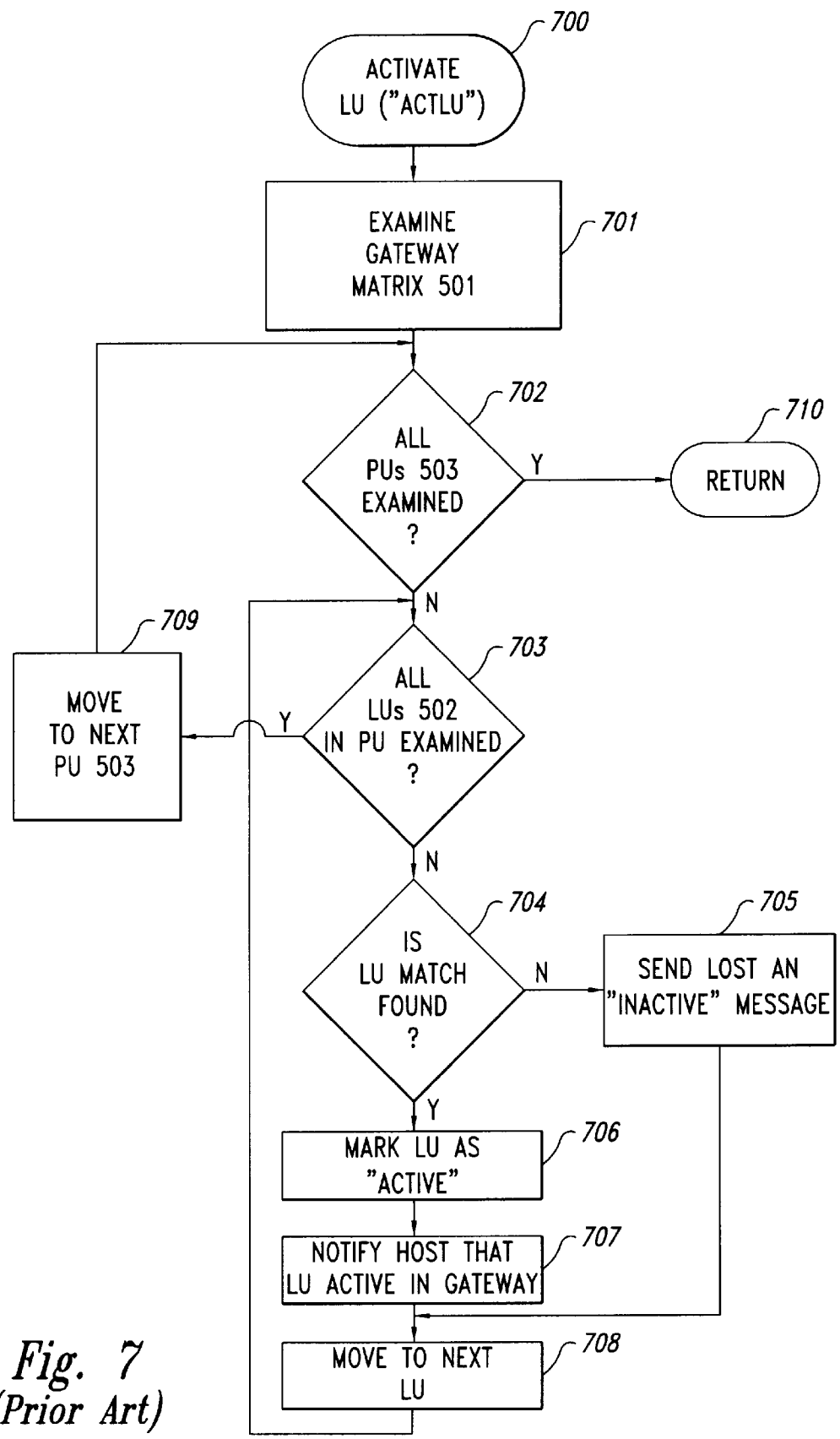
FIG. 7 provides a flowchart illustrating the prior art conventional method for initializing the LU connections between a Gateway and a mainframe host computer.

FIG. 7 provides a flowchart that illustrates the conventional method for initializing the LU connections between a Gateway and a mainframe host computer. As described above, the conventional approach utilizes a static process for building a Gateway Matrix that is later verified using an ACTLU procedure 700. In essence, ACTLU 700 performs a verification for correctness procedure on the Gateway Matrix 501.

The ACTLU procedure 700 examines the Gateway Matrix 501 (step 701). When all of the PUs 503 in the Gateway Matrix 501 have been examined (step 702), then the ACTLU procedure 700 ends (step 710). The ACTLU procedure 700 examines each row of LUs 502 in the columns of PUs 503. Accordingly, the ACTLU procedure 700 next determines if all of the LUs 502 in the present PU 502 have been examined (step 703). If all of the LUs 502 in the present PU 503 have been examined, then the ACTLU procedure 700 moves to the next PU 503 (step 709).

As previously discussed, the ACTLU procedure 700 includes a list of LUs numbers provided by the mainframe host computer. The ACTLU procedure 700 determines if the present LU 502 in the Gateway Matrix 501 matches an LU number on its Table of Boundary LUs from the mainframe host computer 100 (step 704). If the ACTLU procedure 700 does not find that the present LU 502 matches an LU number on the list of LU numbers provided by the mainframe host computer 101, then the ACTLU procedure 700 sends the mainframe host computer 101 an "inactive" message (step 705). The ACTLU procedure 700 performs this task by either issuing a negative response or a positive response accompanied by a device power off control vector command. In both cases, the response returned to the mainframe host computer 101 indicates that the Gateway 401 does not control a particular LU number in mainframe host computer's Table of Boundary LUs. The ACTLU procedure 700 then moves to the next LU (step 708).

If the ACTLU procedure 700 finds the present LU 502 in the Table of Boundary LUs from the mainframe host computer 101 (step 704), then the ACTLU procedure 700 marks the LU as active (step 706) and notifies the mainframe host computer 101 that the present LU is active in the Gateway 401 (step 707). This connection between an LU on the Gateway 401 and an LU on the mainframe host computer 101 places the LU in a Resource Pool and allows subsequent traffic to occur over the LUs. The ACTLU procedure 700 then moves to the next LU (step 708).

The standard procedure described above performs adequately and has been accepted for initializing Gateways for many years. Consequently, the vast majority of programmers would not consider this procedure to be a "squeaky wheel."

In contrast to this conventional impression, the inventors recognized that the standard Gateway initialization procedure may cause several problems, none of which had been previously recognized, and all of which reduce the network's efficiency. The first two problems discovered by the inventors arise during the start-up or initialization procedure for an SNA Gateway. The third problem discovered by the inventors arises during operation of the SNA Gateway.

As previously mentioned, a single PU may contain definitions for up to 255 LUs. If the programmer defines each of the 255 LUs as "available" while VTAM lists only 100 as "active," then there are 155 LUs that the Gateway believes are "active" when they are, in fact, not active in the mainframe host computer. The 155 mixed status LUs essentially constitute "land mines" on the Internet super highway that will produce no good results if utilized and may even cause harm in some instances.

Figure 8A:
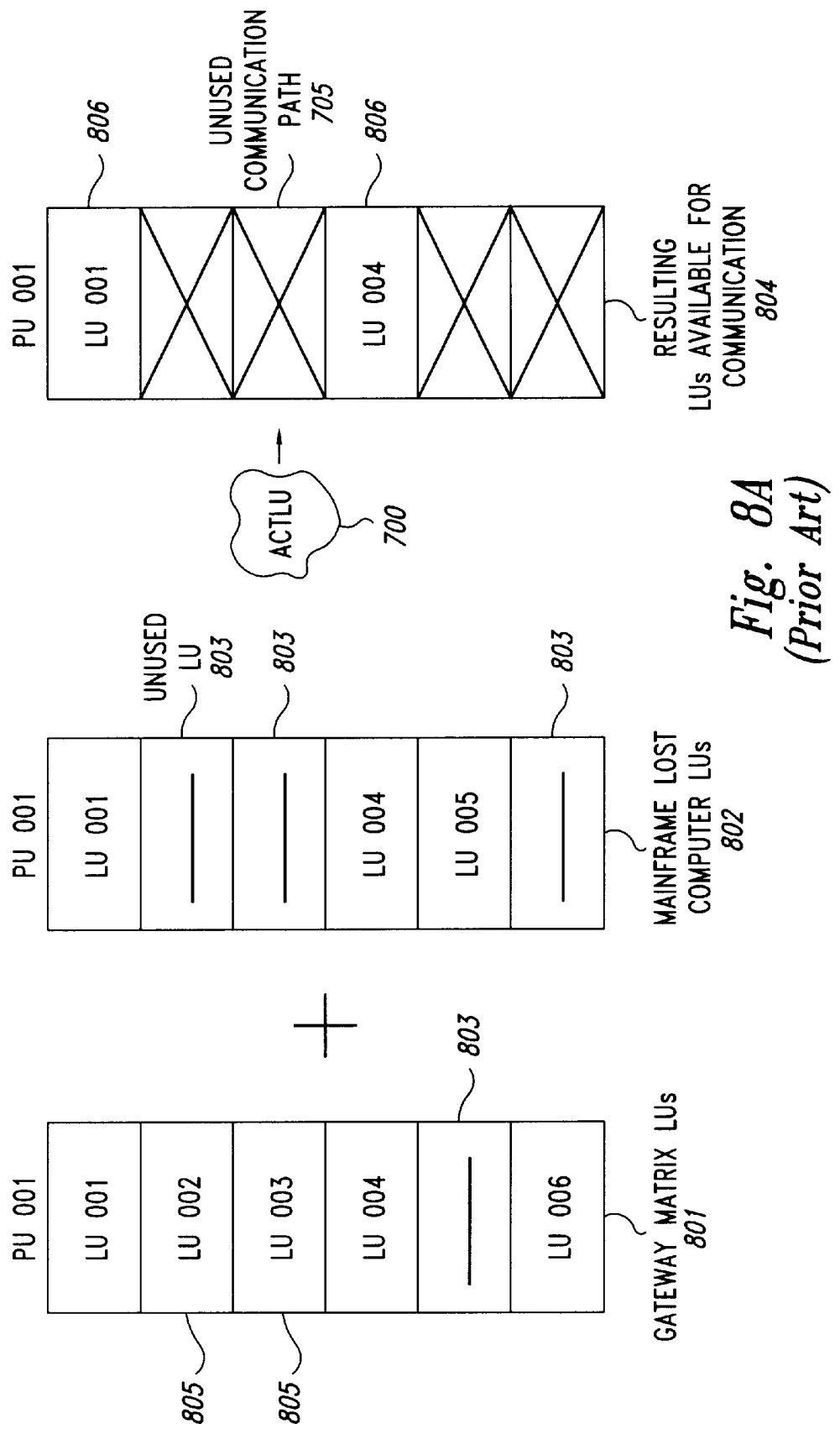
FIGS. 8A and 8B illustrate problems associated with the convention procedure for initializing the LUs in a Gateway.

FIG. 8A illustrates this first prior art problem using a Gateway Matrix having one PU and six LUs. As shown in FIG. 8A, the Gateway Matrix LUs 801 are matched with the mainframe host computer's Table of Boundary LUs 802 by the ACTLU procedure 700. The mainframe host computer's Table of Boundary LUs 802 contains three unused LUs 803, and the Gateway Matrix LUs 801 also contains one unused LU 803. As discussed above, for an active LU connection to be established, an LU from the Gateway Matrix LUs 801 must match an LU from the mainframe host computer LUs 802. Accordingly, the resulting list of LUs available for communication 804 only contains two LUs 806 available for communication. The ACTLU procedure does not change the Gateway Matrix 801. Thus, two LUs 805 will remain marked as open coming into the Gateway but have no corresponding active LU in the mainframe host computer. Under some circumstances, this may lead to anomalous conditions in the computer network.

Another problem arises when the programmer lists fewer LUs in the Gateway as "available" than VTAM lists as "active." For example, the Gateway lists 30 LUs as being "available" while VTAM considers all 255 to be "active." As a result, the Gateway has 225 LUs that could have been used. Since these LUs can never be used because they do not have a matching LU in the Gateway Matrix, they waste processing cycles in the computing system each time they are encountered. In addition, by not utilizing LUs that could have been utilized, the network has a smaller bandwidth than would otherwise have been available.

Figure 8B:
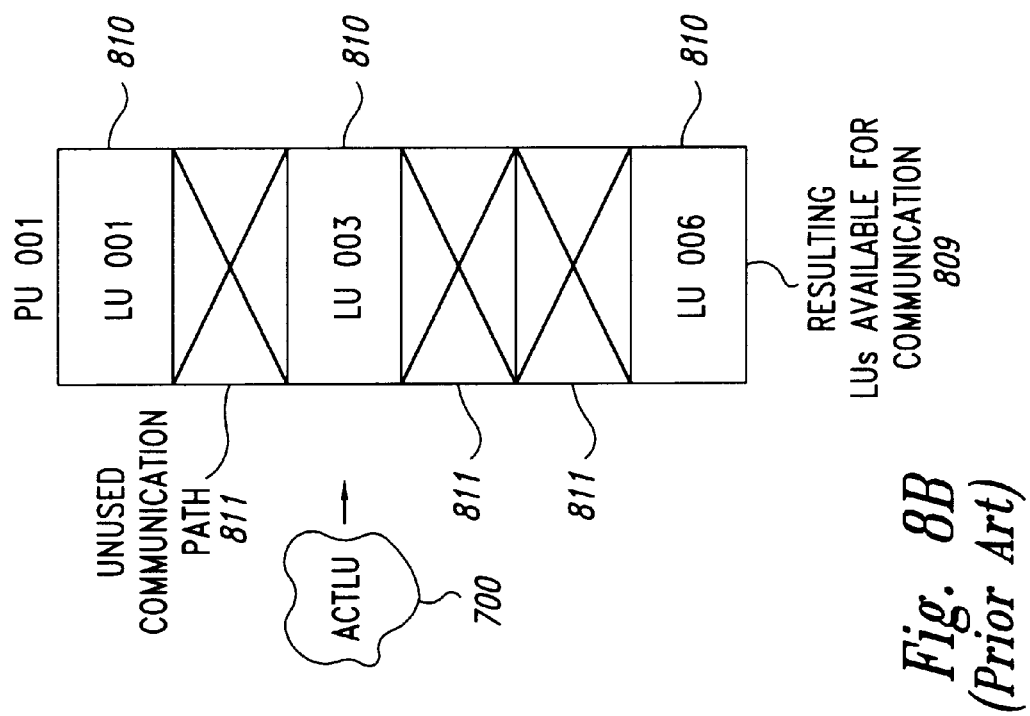
Figure 8B:
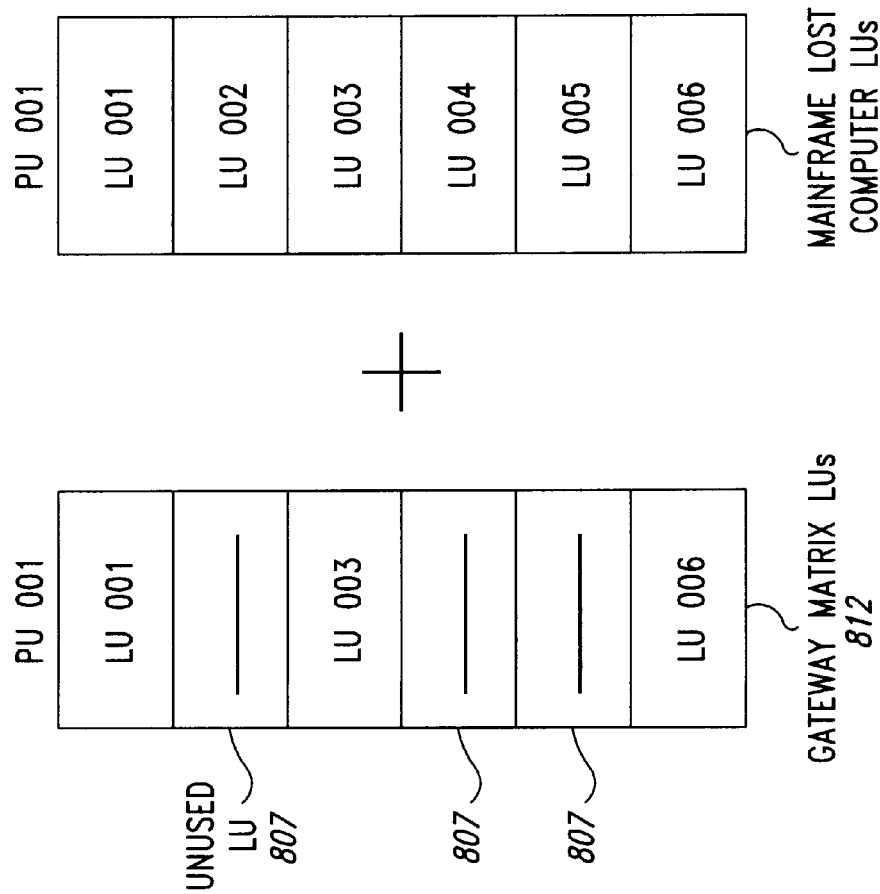

FIG. 8B illustrates this second prior art problem using a Gateway Matrix having one PU and six LUs. As shown in FIG. 8B, the Gateway Matrix LUs 812 are matched with a list of mainframe host computer LUs 808 by the ACTLU procedure 700. The mainframe host computer LUs 808 contains no unused LUs 807, and the Gateway Matrix LUs 812 contains three unused LUs 807. As discussed above, for an active LU connection to be established, an LU from the Gateway Matrix LUs 812 must match an LU from the mainframe host computer LUs 808. Accordingly, the resulting list of LUs available for communication 809 only contains three LUs 810 available for communication and three unused LUs 811. The ACTLU procedure does not change the Gateway Matrix LUs 812. Thus, the three LUs 807 will remain marked as unused. However, since the mainframe host computer indicates that these LUs are active, then the mainframe host computer will waste processing cycles on these LUs. In addition, the computing network will utilize a smaller bandwidth than would otherwise have been available.

Both of the above problems may occur at start up. Another problem occurs when the LU connections in the Gateway change while the SNA network is up and running. The number of active LUs can also change dynamically during operation if one of the LUs marked active by VTAM becomes inactive at the Gateway. In this way, the Gateway dynamically become out of sync with VTAM.

Having recognized these problems, the inventors then set about finding a solution that initializes the Gateway while also averting the problems discussed above. The inventors noted that information on the correct set of LU connections lies in the mainframe host computer and not in the Gateway. The inventors then realized that rather than using the mainframe host computer's Table of Boundary LUs merely for verification, this data could instead be used to perform the initialization procedure itself. Thus, the inventors decided to use ACTLU, or a similar procedure, not for its conventional correctness purpose but for specifying the configuration of the Gateway. The inventors created a revised ACTLU procedure that determines which LUs are active in the Table of Boundary LUs in order to resolve the set of active LUs in the Gateway Matrix.

The inventors' solution frees the human Gateway administrator from having to statically define LUs and LU Pools (devices and pools of devices) for client connectivity. Now, the Gateway administrator need go no further than defining the network adapter and the PUs (as before), and the normal SNA communication processes will utilize the activation sequences with VTAM to determine the LUs that VTAM has defined for each of the statically defined PUs and initialize the LUs accordingly, placing newly discovered LUs in an LU Resource Pool. Thus, the inventors' solution provides fuller and more accurate usage of the LUs in an SNA network.

Figure 9:
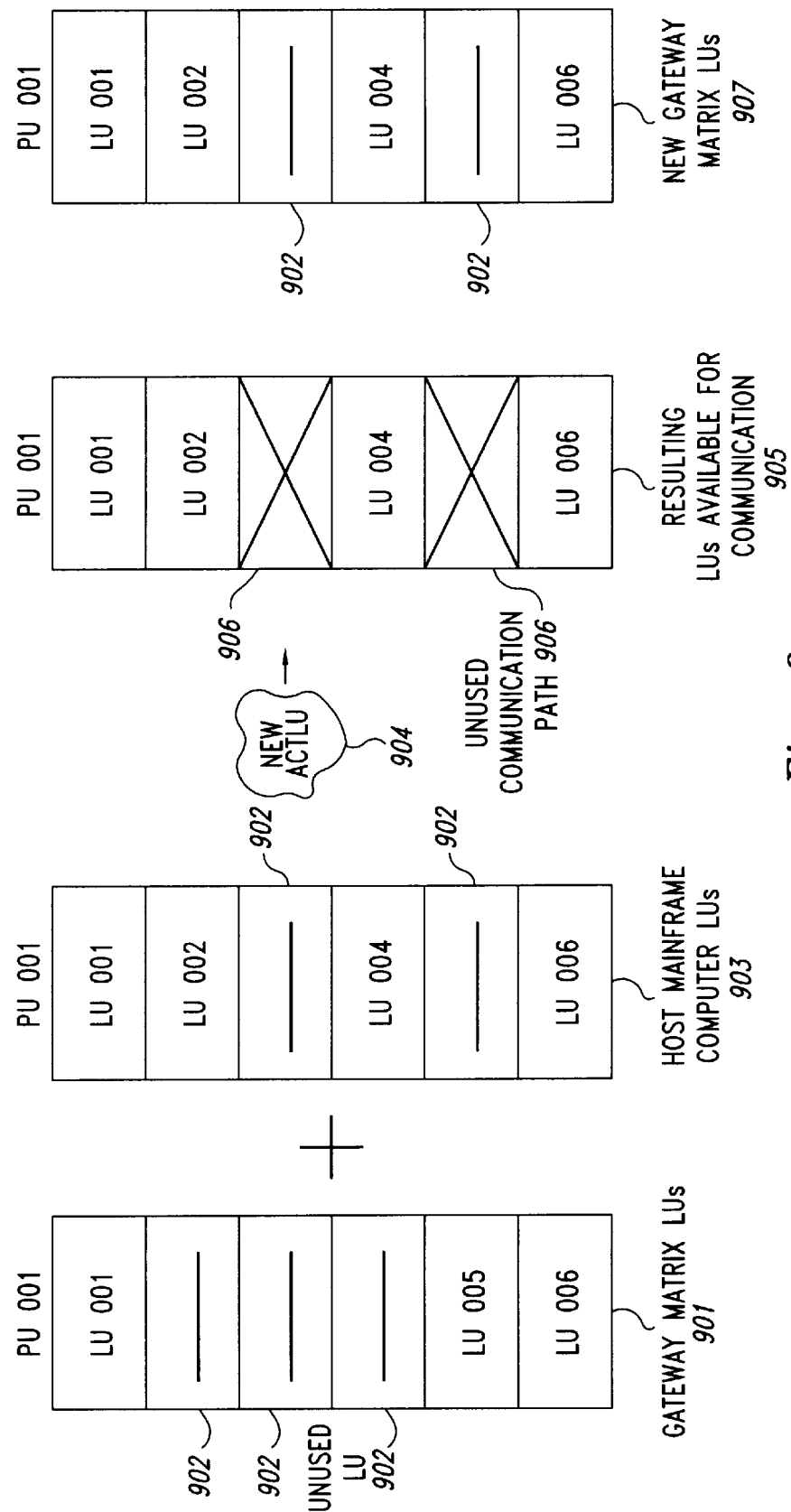
FIG. 9 illustrates the LUs available for communication and the new Gateway Matrix LUs, according to an embodiment of the present invention.

FIG. 9 illustrates the LUs available for communication and the new Gateway Matrix LUs, as provided by an embodiment of the present invention. As shown in FIG. 9, the Gateway Matrix LUs 901 are matched with a list of mainframe host computer LUs 903 by the new ACTLU procedure 904. The mainframe host computer LUs 903 contains two unused LUs 902, and the Gateway Matrix LUs 901 contains three unused LUs 902. In the prior art ACTLU procedure, an active LU connection could only be established when an LU from the Gateway Matrix matched an LU from the mainframe host computer. As discussed above, the inventors recognized that only the mainframe host computer maintains the correct list of active LUs, so they designed the new ACTLU procedure 904 procedure to resolve all communications paths to resemble the list of active LUs found on the mainframe host computer. In addition, the new ACTLU procedure 904 also modifies the Gateway Matrix LUs 901 to produce a New Gateway Matrix LUs 907 that matches the LUs in the list of mainframe host computer LUs 903. Thus, both the resulting LUs available for communication 905 and the New Gateway Matrix LUs 907 match the mainframe host computer LUs 903. As shown, the resulting LUs available for communication 905 contain two unused LUs 906.

The new ACTLU procedure 904 contrasts with the prior art ACTLU procedure, such as the ACTLU procedure 700 shown in FIG. 7, as follows. Under the prior art ACTLU procedure, the resulting list of LUs available for communication, using the Gateway Matrix 901 and the mainframe host computer's LUs 903, would have only been LU001 and LU006. LU002 and LU004 would not have been used. In addition, the Gateway Matrix 901 would not have been modified to create the new Gateway Matrix LUs 907. Thus, LU005 would still remain marked as available, which could potentially have caused problems for network traffic coming into the Gateway.

Aspects of the present invention may be readily applied to static Gateway environments, such as when the Gateway is started. For example, the appropriate list of active LUs are always marked when the Gateway is started, according to an embodiment of the invention. Of course, not all network system managers start the Gateway with the same frequency. For example, some network system managers restart the Gateway on a daily basis, while others start the Gateway less often, and still others restart the Gateway more often, depending upon their preferences and precise system configuration.

The inventors' dynamic approach is also operable when the list of active LUs changes while the Gateway is still running. Embodiments of the present invention perform adequately in dynamic environments because the accepted SNA network management practice calls for the mainframe host computer to first deactivate the LUs when VTAM adds or removes an LU. Following the addition or subtraction of the LUs, the Gateway is restarted, which in turn activates a procedure that establishes the connections in the Gateway. Thus, updates to the list of active LUs take effect essentially immediately, according to these embodiments of the invention.

An embodiment of the inventors' new ACTLU procedure operates as follows. When VTAM determines that a node in the network, such as the Gateway 401 shown in FIG. 4, needs to be initialized, VTAM reads the configuration file for that node, such as the Table of Boundary LUs. VTAM sends a specific Request Unit (RU) known as an "Activate PU" (ACTPU) to the Gateway 401 that informs the Gateway 401 that VTAM now recognizes the Gateway 401 as available for network activity. In response, the Gateway 401 retrieves the PUs in its static configuration. If these PUs are bound, the Gateway 401 sends a positive sense code to the RU, indicating that the ate way 401 is available.

VTAM then sends an RU "Activate Logical Unit" (ACTLU) that signals to the Gateway 401 that its LUs are now viewed by the network as online and active. ACTLU includes a list of LUs that the mainframe host computer 101 believes to be active in the Gateway 401. The list of LUs that the mainframe host computer believes to be active are contained in the VTAM configuration files 602 (see FIG. 6).

The Gateway 401 again checks its user-defined configuration file, the Gateway Matrix 501, to determine the validity of each LU in the list provided by ACTLU. If the LU is in the Gateway Matrix 501, then the Gateway 401 marks the LU as "Active" and sends the ACTLU with a positive response code for that LU. If the Gateway 401 does not find a matching LU, and the link to the mainframe host computer is configured to discover LUs, the Gateway 401 merges the LU described in the ACTLU with any static configuration information at its disposal, such as the Gateway Matrix 501, to create a new LU and then marks the new LU as "Active." The Gateway 401 then responds with a positive sense code, with an "SLU disabled" control vector signifying a powered off device. If the link to the mainframe host computer for this LU is not configured to accept LU discovery, a negative sense code is returned to VTAM in response to the ACTLU, and the device is not added to the Resource Pool of available devices available to the SNA network.

Figure 10:
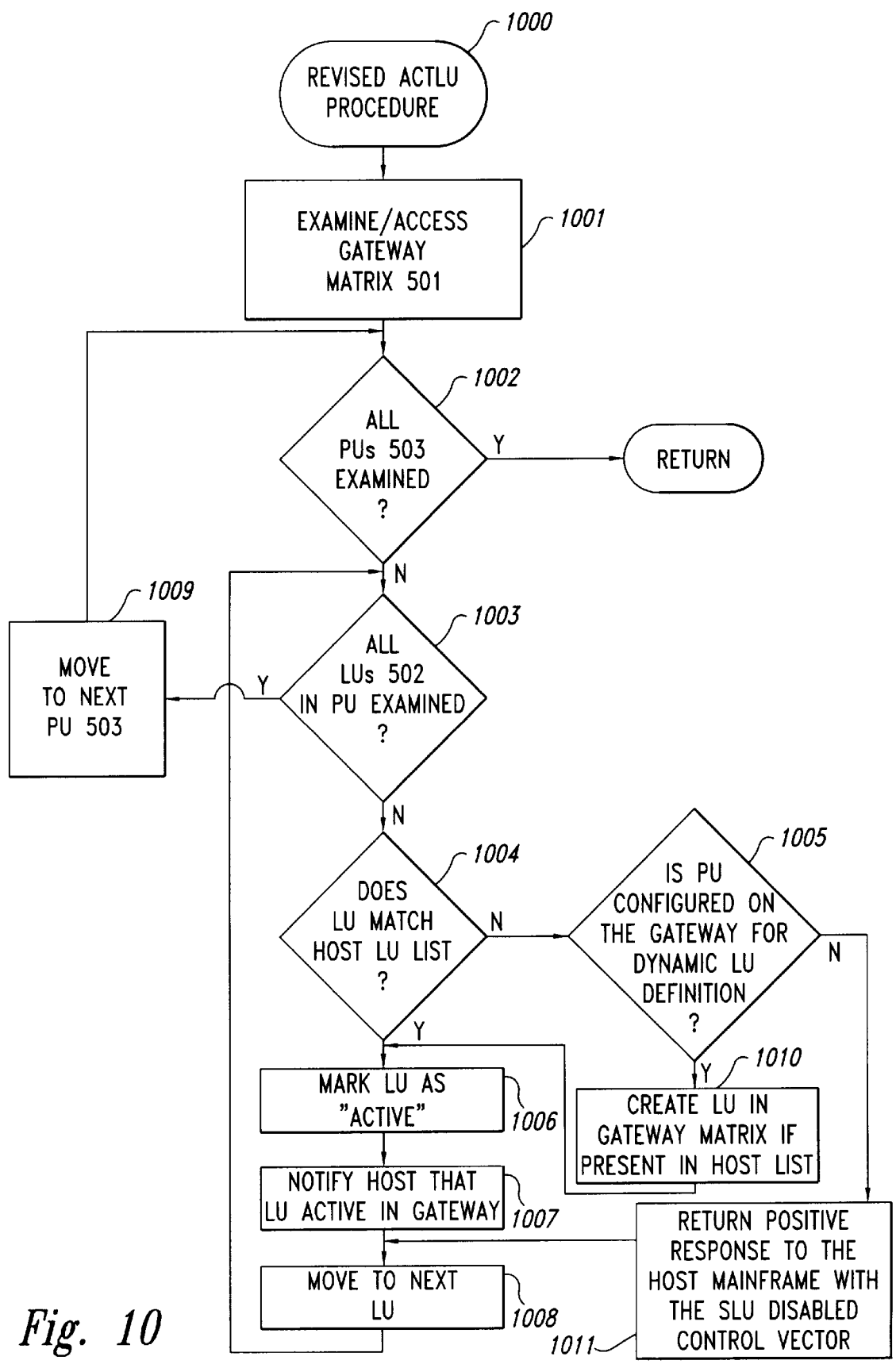
FIG. 10 provides a flowchart illustrating an embodiment of the present invention.

FIG. 10 provides a flowchart illustrating an embodiment of the present invention. As described above, the invention resolves the data regarding the LUs in the Gateway Matrix, such as the Gateway Matrix 501 shown in FIG. 5, with the data regarding the LUs stored in the mainframe host computer. A revised ACTLU procedure 1000 performs the initialization procedure.

The communications systems of the SNA network are initialized according to the standard procedures. The network hardware adapter and PUs are loaded into the mainframe host computer as usual. In addition, the LU definitions available to the mainframe host computer are also defined in Resource Pools, in the manner previously discussed.

The revised ACTLU procedure 1000 examines the Gateway Matrix 501, if one is available (step 1001). If the Gateway matrix 501 has not been previously created, then the ACTLU procedure 1000 may ensure that the Gateway matrix is created if needed. Since information must no longer be set by a human systems manager, the Gateway matrix may not exist prior to the initialization procedure in many instances.

When all of the PUs 503 in the Gateway Matrix have been examined (step 1002), then the new ACTLU procedure ends. Until the end of the PU list is reached, the new ACTLU procedure examines each row of LUs in the columns of PUs. Accordingly, the new ACTLU procedure determines if all of the LUs 502 in the present PU have been examined (step 1003). If all of the LUs 502 in the present PU 503 have been examined, then the new ACTLU procedure 1000 moves to the next PU 503 (step 1009).

If all the LUs 502 in the present PU have not been examined (step 1003), then ACTLU procedure examines the present LU 502. If the new ACTLU procedure cannot find a match between the present LU 502 in the Gateway Matrix 501 and the list of LUs from the mainframe host computer (step 1004), then the new ACTLU procedure determines if the PU is configured on the Gateway for dynamic LU definition (step 1005). If the PU has not been configured on the Gateway for dynamic LU definition, then the new ACTLU procedure returns a positive response to the mainframe host computer 101 with an SLU disabled control vector (step 1011). If the mainframe host computer 101 has been configured for dynamic LU definition (step 1005), then the new ACTLU procedure creates an LU in the Gateway Matrix when the LU is present in the Table of Boundary LUs on the mainframe host computer 101 (step 1010).

If the new ACTLU procedure determines that the present LU 502 is found in the Boundary LU Table in the mainframe host computer (step 1004) or if a new LU is created in the Gateway Matrix 501 (step 1010), then the new ACTLU procedure 1000 marks the LU as "Active" (step 1006). The new ACTLU procedure notifies the mainframe host computer 101 that the present LU is active in the Gateway 401 (step 1007). The connections established by the new ACTLU procedure between an LU on the Gateway and an LU on the mainframe host computer allows subsequent traffic to occur over the LUs. The new ACTLU procedure then moves to the next LU (step 1008) and returns to step 1003 until all LUs 502 have been examined.

Embodiments of the invention may be described in pseudo code. Table 1 below provides exemplary pseudo code for configuring the PUs and LUs in the SNA network at start-up. A pointer variable, Ptr_PU, points to the first PU in the SNA Gateway's list of PUs. Configuration data is then retrieved from the PU and then added to the configuration memory in the mainframe host computer. Configuration data is then read for each LU of the PU's LUs using the pointer variable Ptr_LU. Each LU's configuration data is then added to the configuration memory of the Boundary LU Table in the mainframe host computer. Finally, each LU is added to the network client Resource Pool. The Resource Pool is used to satisfy network client requests to use a LU. After processing the PU heading the list of PUs in the SNA Gateway, Ptr_PU then processes the remaining PUs in the list one at a time.

TABLE 1

```
Ln. 1    Configure_SNA_Gateway(SNA_Gateway(Network PUs))
Ln. 2    Pointer Variable Ptr_PU, Ptr_LU;
Ln. 3    {
Ln. 4
Ln. 5        Ptr_PU = SNA_Gateway(Network PUs);
Ln. 6
Ln. 7        While (Ptr_PU <> NUL)
Ln. 8            {
Ln. 9                Read static configuration data for Ptr_PU;
Ln. 10               Add Ptr_PU to static configuration memory allocated in
Ln. 11                   the SNA gateway computer;
Ln. 12               Ptr_LU = Ptr_PU LUs;
Ln. 13
Ln. 14               While(Ptr_LU <> NUL)
Ln. 15                   {
                         Add Ptr_LU to static configuration memory allocated
                             in the SNA gateway computer;
Ln. 1                    /* The static configuration memory is also referred
Ln. 2                       to as the "Boundary LU Table" */
Ln. 3
Ln. 4                    Add Ptr_LU to the network client resource pool;
Ln. 5
Ln. 6                    Ptr_LU++;
Ln. 7                    }
Ln. 8
Ln. 9                Ptr_PU++;
Ln. 10           }
Ln. 11   }
```

The processing of SNA run-time requests is described in pseudo code in Table 2 below. The SNA_Run_Time_Processing( ) routine may be called continuously during the operation of the SNA network. The SNA_Run_Time_Processing( ) routine receives from VTAM an SNA Request Unit (RU). If the RU equals "ACTPU," then the routine attempts to determine if the request refers to a PU already stored in memory from the Configure_SNA_Gateway( ) routine above, or if the PU is new. If the PU is not presently found in memory, then a negative response is issued. Otherwise, a positive response is issued.

If the SNA_Run_Time_Processing( ) routine receives an RU that equals "ACTLU," then the routine attempts to determine if the request refers to an LU already stored in the Boundary LU Table discussed above with regard to the Configure_SNA_Gateway( ) routine. If the LU cannot be located in static memory, then the routine determines if the PU controlling the LU has been configured for dynamic LU discovery. If the PU has been configured for dynamic LU discovery, then the routine formats a positive response with an SLU disabled control vector. A positive response is sent to the VTAM SSCP, and the LU is added to the Resource Pool. If the PU is not configured for dynamic LU discovery, then a positive response is formatted with an SLU disabled control vector. The positive response is sent to the VTAM SSCP but the LU is not added to the Resource Pool. Thus, the LU is in effect invisible to both VTAM SSCP on the mainframe host computer, and to network clients requesting services of the SNA Gateway.

Finally, if the SNA RU is any other type of request, then the routine sends the RU to the SNA communications engine for normal processing. The SNA communications engine may be the SSCP in some embodiments of the invention.

TABLE 2

```
Ln. 1   SNA_run_time_processing(VTAM(SNA_Request_Unit))
Ln. 2   {
Ln. 3
Ln. 4       If   (SNA_Request_Unit Type = 'ACTPU')
Ln. 5           Then
Ln. 6           {
Ln. 7               /* See Configure_SNA_Gateway() above */
Ln. 8               If   ('ACTPU' = a PU static configuration
                                         memory)
Ln. 9                   {
Ln. 10                      Then
Ln. 11                      {
Ln. 12                          Format an 'ACTPU' Positive response;
Ln. 13                          Send the positive response to VTAM SSCP;
Ln. 14                      }
Ln. 15                      Else
Ln. 16                      {
Ln. 17                          Format a 'ACTPU' negative response sense
                                                                code;
Ln. 18                          Send the negative response to VTAM SSCP;
Ln. 19                      }
Ln. 20                  }
Ln. 21          }
Ln. 22          Else
Ln. 23          {
Ln. 24              If   (SNA Request Unit Type Equals 'ACTLU')
Ln. 25                  Then
Ln. 26                  {
Ln. 27                      /* Attempt a "Boundary LU Table" lookup for
Ln. 28                          the LU in the 'ACTLU' */
Ln. 29                      If   ('ACTLU' is a statically configured LU)
Ln. 30                          Then
Ln. 31                          {
Ln. 32                              Format an 'ACTLU' Positive
                                        response with a SLU_Disabled
                                        control vector;
Ln. 33                              Send the positive response
Ln. 34                              to VTAM SSCP;
Ln. 35                          }
Ln. 36                          Else
Ln. 37                          {
Ln. 38                              If (The PU owning this LU is
                                        configured for dynamic LU
                                        discovery)
Ln. 39                              Then
Ln. 40                              {
Ln. 41                                  Format a 'ACTLU' Positive
                                            response with a SLU_Disabled
                                            control vector;
Ln. 42                                  Send the positive response
Ln. 43                                  to VTAM SSCP;
Ln. 44                                  Add the LU to the resource pool;
Ln. 45                              }
Ln. 46                              Else
Ln. 47                              {
Ln. 48                                  Format a 'ACTLU' Positive
                                            response with a SLU_Disabled
                                            control vector;
Ln. 49                                  Send the positive response
Ln. 50                                  to VTAM SSCP;
Ln. 51                              }
Ln. 52                          }
Ln. 53                      }
Ln. 54                  }
Ln. 55
Ln. 56              If (SNA Request Unit Type =
Ln. 57                      All Other Request_Units (RUs))
Ln. 58                  {
Ln. 59                      Dispatch the RU to SNA communications engine for
                            normal processing;
Ln. 60                  }
Ln. 61  }
```

In an alternative embodiment of the invention, no dependent LUs are defined on the Gateway, and the dependent Logical Unit Activation Request (ACTLU) is used to specify that the Logical Unit definition on the Gateway needs to be created, and the status of the newly created Logical unit needs to be set to "Active." The newly created LU is then added to a pool of resources that may be made available to clients on another network.

In another alternative embodiment of the invention, dependent LUs in the mainframe host computer may be utilized in the creation of matching dependent LUs in the Gateway Matrix. Once the matching dependent LUs have been created, then a pipe may be created from a dependent LU in the mainframe host computer to a new dependent LU in the Gateway Matrix. A pipe is a portion of a computer's memory that can be used by one process to pass information along to another process. Thus, in this embodiment, a client may send a request to create an LU at a Gateway. The mainframe host computer then creates an LU and passes it to the client. This embodiment of the invention essentially entails creating a dependent LU so that the configuration on the client matches that of the mainframe host computer.

Figure 11:
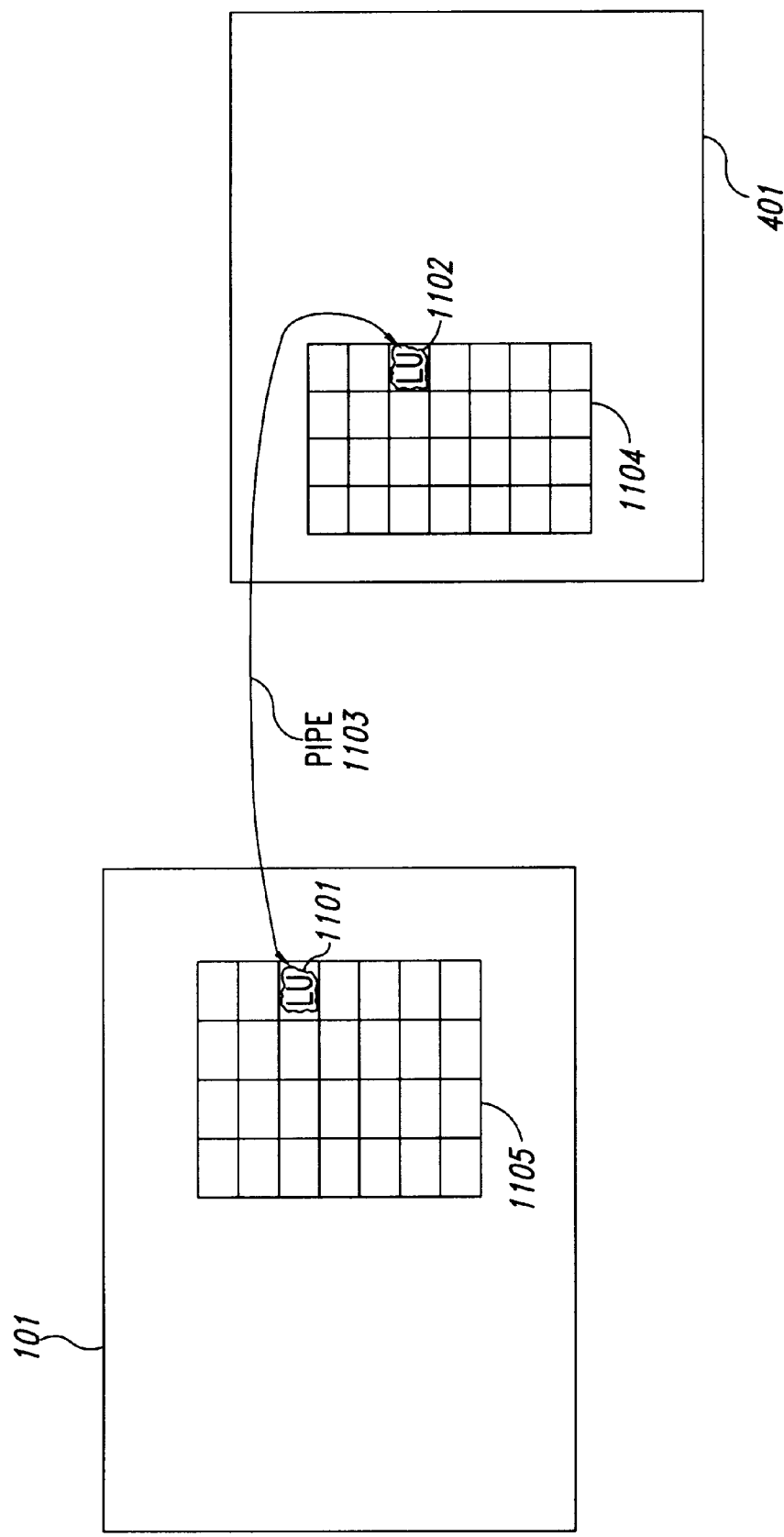
FIG. 11 illustrates an alternative embodiment of the invention in which a dependent LU on the mainframe host computer creates a dependent LU in the Gateway and then establishes a pipe for communications.

FIG. 11 illustrates an alternative embodiment of the invention in which a dependent LU on the mainframe host computer is utilized in the creation of a dependent LU in the Gateway 401 and then a pipe is established for communications between the matching LUs. As shown in FIG. 11, the mainframe host computer 101 contains a list of the active LUs 1105 in the mainframe host computer 101. The Gateway 401 contains a Gateway Matrix 1104. After examination of the Gateway Matrix 1104 reveals that the Gateway Matrix does not contain an LU matching dependent LU 1101 of the mainframe host computer 101, then a modified ACTLU or similar procedure creates a dependent LU 1102 in the Gateway Matrix 1104.

In yet another alternative embodiment of the invention, the Gateway administrator may utilize a hybrid approach in which the administrator defines a subset of the LUs under the PUs and lets the Gateway discover any LUs that have been left out in the manner described above.

In another embodiment of the invention, the Gateway administrator may still configure the Gateway by the prior method (completely static) and prevent VTAM from executing the LU discovery procedure. In this embodiment, the Gateway administrator receives a list of LUs from the VTAM systems programming staff, types the list into the Gateway's configuration, and manually defines the LU Resource Pool(s). The Gateway administrator then adds the LUs to the Resource Pool(s) making them available to network clients. This process is prone to error, and liable to become out of date quickly. This embodiment of the invention includes a switch that enables the Gateway administrator to disable the dynamic embodiment of the invention disclosed above and process the list according to the prior art procedure.

While the present invention has been described with reference to a preferred embodiment thereof, those skilled in the art will appreciate that various changes in form and detail may be made without departing from the intended scope of the present invention as defined in the appended claims. For example, the structure of the Gateway, the Gateway Matrix, and the mainframe host computer may differ from those shown in the drawings. The Gateway and mainframe host computer's actual communications connections with each other may also differ from the functional description described above.

Although specific embodiments of, and examples for, the invention are described herein for illustrative purposes, various equivalent modifications are possible within the scope of the invention, as will be recognized by those skilled in the relevant art. The teachings provided herein of the invention can be applied to other computing systems, not necessarily to the SNA computing network described above. Various exemplary computing systems, and accordingly various other system configurations can be employed under the invention. The embodiments of the invention disclosed herein have been discussed with regard to computerized network installations, such as those using large centralized computing systems. However, the invention finds applicability in other computing systems, such as small, portable computerized systems and even hand-held computing devices. For example, instead of a mainframe host computer, the invention is applicable to another type of host computer such as a workstation host computer. The invention also finds applicability in a network of telecommunications devices, such as network telephones that operate under the principles of the invention.

In yet another embodiment of the invention, the procedure for dynamically configuring the LUs is applied to another computing system that operates in a manner similar to the SNA network described above. The method for dynamically configuring logical units may also be applied to telecommunications networks and not necessarily to the exemplary computing network described herein.

Moreover, various aspects of the invention may even be comprised of micro-code provided in various pieces of hardware equipment, provided that the collective operation of the system functions in the manner that has been described.

These and other changes can be made to the invention in light of the above-detailed description. In general, in the following claims, the terms used should not be construed to limit the invention to the specific embodiments disclosed in the specification and the claims, but should also be construed to include all Gateway activation systems that operate under the claims. Accordingly, the invention is not limited by the specific embodiments provided in the disclosure, but instead its scope is determined by the following claims.

What is claimed is:

1. An automated, processor implemented method for automatically generating a Gateway collection of entries in a Gateway, the Gateway collection representing SNA logical units, the Gateway collection to match a host collection of entries on a host computer, the host collection representing SNA logical units, the Gateway communicatively linked to an SNA network having the host computer, the automated, processor implemented method comprising:

receiving information based on the host collection from the host computer;

automatically identifying, without human assistance, SNA logical units indicated by the host collection based upon the information received from the host computer; and creating, without human assistance, an entry in the Gateway collection to indicate an SNA logical unit corresponding to each identified SNA logical unit represented by the host collection.

2. The automated, processor implemented method of claim 1, further comprising:

indicating each SNA logical unit represented by the Gateway collection as active.

3. The automated, processor implemented method of claim 2 wherein the indicating as active is based upon each SNA logical unit represented by the Gateway collection being available for communications from one or more of the following: another network communicatively linked to the Gateway and one or more applications internal to the Gateway.

4. The automated, processor implemented method of claim 2 wherein the indicating as active is based upon each SNA logical unit represented by the Gateway collection being available for communications from the SNA network.

5. The automated, processor implemented method of claim 1, further comprising:

indicating, without human assistance, as non-active, SNA logical units represented by entries in the Gateway other than those entries of the Gateway collection.

6. The automated, processor implemented method of claim 1 wherein SNA data transmitted from the Gateway to the host computer pertaining to a SNA logical unit represented by an entry of the Gateway collection are formatted for the host computer.

7. The automated, processor implemented method of claim 1 wherein SNA data transmitted from the Gateway to another network communicatively linked to the Gateway are formatted for an SNA network.

8. The automated, processor implemented method of claim 1 wherein the receiving information comprises receiving table entries and the creating comprises creating table entries.

9. The automated, processor implemented method of claim 1 wherein the receiving information comprises receiving list entries and the creating comprises creating list entries.

10. The automated, processor implemented method of claim 1 wherein the receiving information comprises receiving matrix entries and the creating comprises creating matrix entries.

11. The automated, processor implemented method of claim 1 wherein the receiving information comprises receiving list entries and the creating comprises creating table entries.

12. The automated, processor implemented method of claim 1 wherein the receiving information comprises receiving list entries and the creating comprises creating matrix entries.

13. The automated, processor implemented method of claim 1 wherein the receiving information comprises receiving table entries and the creating comprises creating list entries.

14. An automated system to automatically generate entries for a Gateway Matrix in a Gateway, each Gateway Matrix entry corresponding to SNA logical units being represented by entries in a list of SNA logical units, the list of SNA logical units being on a host computer, the Gateway being communicatively linked to an SNA network having the host computer, the automated system comprising:

an automated SNA logical unit transmitter configured to automatically transmit to the Gateway an indication of SNA logical units represented by the list of SNA logical units in the host computer upon transmittal of a message from the Gateway Matrix; and an automated Gateway Matrix entry creator that, based on the indication transmitted to the Gateway, automatically creates a Gateway Matrix entry corresponding to each SNA logical unit represented by an entry in the list on the host computer of SNA logical units.

15. The automated system of claim 14 wherein the automated Gateway Matrix entry creator is configured to create the Gateway Matrix entries to indicate that the corresponding SNA logical units are active.

16. The automated system of claim 15 wherein the Gateway Matrix entries are created to indicate that the corresponding SNA logical units are active based upon their availability for communications from one or more of the following: another network communicatively linked to the Gateway and one or more applications internal to the Gateway.

17. The automated system of claim 15 wherein the Gateway Matrix entries are created to indicate that the corresponding SNA logical units are active based upon their availability for communications from the SNA network.

18. The automated system of claim 14 wherein the automated Gateway Matrix entry creator is configured to create the Gateway Matrix entries to indicate as active each SNA logical unit represented by an entry on the list in the host computer corresponding to a SNA logical unit available to the host computer.

19. The automated system of claim 14 wherein the automated Gateway Matrix entry creator is further configured to indicate additional entries in the Gateway Matrix as non-active when the additional entries do not correspond with SNA logical units represented by entries on the list in the host computer.

20. The automated system of claim 14 wherein SNA data transmitted from the Gateway to the host computer pertaining to an SNA logical unit corresponding to a created Gateway Matrix entry are formatted for a mainframe host computer.

21. The system of claim 14 wherein SNA data transmitted from the Gateway to another network are formatted for other than an SNA network.

22. The automated system of claim 14 wherein the automated Gateway Matrix entry creator is contained within an ACTLU procedure.

23. An automated, computer-implemented method for automatically coordinating entries of a Gateway Matrix in a Gateway with a list of entries identifying SNA logical units, the list being on a host computer, the Gateway communicatively linked to an SNA network, the automated, computer-implemented method comprising:

sending a message from the Gateway Matrix to the host computer;

automatically sending information associated with the list on the host computer from the host computer to the Gateway Matrix via the SNA network in response to receiving the message at the host computer from the Gateway Matrix;

automatically determining the SNA logical units identified by the entries of the list on the host computer based upon the information sent from the host computer to the Gateway Matrix via the SNA network; and automatically coordinating the entries of the Gateway Matrix to correspond with the list of entries on the host computer based on the determined SNA logical units.

24. The automated computer-implemented method of claim 23, further comprising:

indicating using the entries of the Gateway Matrix that the corresponding entries on the list on the host computer identify logical units that are active.

25. The automated, computer-implemented method of claim 24 wherein each SNA logical unit corresponding to an entry in the Gateway Matrix with an active indication is available for communications from one or more of the following: another network communicatively linked to the Gateway and one or more applications internal to the Gateway.

26. The automated, computer-implemented method of claim 24 wherein each SNA logical unit corresponding to an entry in the Gateway Matrix with an active indication is available for communications from the SNA network.

27. The automated, computer-implemented method of claim 23, further comprising:

indicating using other entries on the Gateway Matrix that other SNA logical units without corresponding identifying entries on the list on the host computer are non-active.

28. The automated, computer-implemented method of claim 23 wherein SNA data transmitted from the Gateway to the host computer pertaining to an entry in the Gateway Matrix are formatted for a mainframe host computer.

29. The automated, computer-implemented method of claim 23 wherein SNA data transmitted from the Gateway to another network communicatively linked to the Gateway are formatted for an SNA network.

30. A computer-readable medium holding computer-executable instructions for automatically creating entries in a Gateway Matrix in a Gateway, the Gateway communicatively linked to an SNA network, comprising the computer-implemented steps of:

sending to the Gateway from a host computer a list of SNA logical units;

receiving at the Gateway from the host computer the list of SNA logical units; and automatically creating, without human assistance, entries in the Gateway Matrix in the Gateway corresponding to each SNA logical unit on the list of the SNA logical units in response to the receiving.

31. The computer-readable medium of claim 30, further comprising:

indicating as active each created entry in the Gateway Matrix corresponding to an active SNA logical unit on the list of SNA logical units.

32. The computer-readable medium of claim 31 wherein each entry in the Gateway Matrix indicated as active corresponds to an SNA logical unit on the list of SNA logical units that are available for communications from one or more of the following: another network communicatively linked to the Gateway and one or more applications internal to the Gateway.

33. The computer-readable medium of claim 31 wherein each entry in the Gateway Matrix indicated as active corresponds to an SNA logical unit on the list of SNA logical units that are available for communications from the SNA network.

34. The computer-readable medium of claim 30, further comprising:

indicating as non-active entries in the Gateway Matrix that identify SNA logical units without corresponding SNA logical units on the list of the SNA logical units.

35. The computer-readable medium of claim 30 wherein SNA data transmitted from the Gateway to the host computer pertaining to a created entry in the Gateway Matrix are formatted for a mainframe host computer.

36. The computer-readable medium of claim 30 wherein data originating from the SNA network and transmitted from the Gateway to another network are formatted for other than an SNA network.

37. An automated method for creating entries in a Gateway Matrix in a Gateway corresponding to active SNA logical units, the Gateway being communicatively linked to a first network having a host computer, the automated method comprising:

sending a first message from the Gateway to the host computer;

automatically sending a second message from the host computer to the Gateway in response to receiving the first message;

automatically identifying SNA logical units available to the host computer in the first network based solely upon the second message; and automatically creating an entry in the Gateway Matrix corresponding to each identified SNA logical unit available to the host computer in the first network.

38. The method of claim 37, further comprising:

indicating that each created entry in the Gateway Matrix corresponds to an active SNA logical unit.

39. The method of claim 38 wherein the indicating correspondence to an active SNA logical unit further indicates correspondence to an SNA logical unit that is available for communications from one or more of the following: a second network communicatively linked to the Gateway and one or more applications internal to the Gateway.

40. The method of claim 38 wherein the indicating correspondence to an active SNA logical unit further indicates correspondence to an SNA logical unit that is available for communications from the first network.

41. The method of claim 37, further comprising:

indicating that other entries in the Gateway Matrix correspond to non-active SNA logical units without corresponding identified SNA logical units available to the host computer in the first network.

42. The method of claim 37 wherein the first message is sent from the host computer to the Gateway via an SNA network.

43. A processor implemented method for a Gateway to indicate active SNA logical units, the Gateway communicatively linked to an SNA network having a host computer, the processor implemented method comprising:

receiving information from the host computer;

automatically determining, without human intervention, first SNA logical unit identifiers found on the host computer based upon the information received from the host computer; and automatically determining matching pairs of the first SNA logical unit identifiers with second SNA logical unit identifiers on the Gateway; and automatically indicating in the Gateway each matching pair of SNA logical unit identifiers found in the host computer and the Gateway as active.

* * * * *

UNITED STATES PATENT AND TRADEMARK OFFICE
CERTIFICATE OF CORRECTION

PATENT NO.  : 6,173,319 B1
DATED       : January 9, 2001
INVENTOR(S) : Mitchell Owen Peterson and Brian Dudley Silverman It is certified that error appears in the above-identified patent and that said Letters Patent is hereby corrected as shown below:

Column 18, claim 24,
Line 45, "The automated computer-implemented" should read -- The automated, computer-implemented --.

Signed and Sealed this

Sixth Day of November, 2001

*Attest:*

*Attesting Officer*

NICHOLAS P. GODICI
*Acting Director of the United States Patent and Trademark Office*